United States Patent [19]
Brown

[11] Patent Number: 5,432,683
[45] Date of Patent: Jul. 11, 1995

[54] PHOTOGRAPHIC LIGHTING SYSTEM

[76] Inventor: Douglas Brown, 333 Willow Ave., Unit #4, Toronto, Ontario M4E 3K6, Canada

[21] Appl. No.: 110,959

[22] Filed: Aug. 24, 1993

[51] Int. Cl.⁶ .............................................. G03B 15/00
[52] U.S. Cl. ...................................... 362/16; 362/17; 362/18; 362/282; 362/290; 362/293
[58] Field of Search ...................... 362/16, 17, 18, 280, 362/281, 282, 290, 293, 307, 321, 322, 255, 256

[56] References Cited

U.S. PATENT DOCUMENTS

| | | | |
|---|---|---|---|
| 1,824,894 | 9/1931 | Hopkin, Jr. | 362/293 |
| 1,940,580 | 12/1933 | Caddy et al. | 362/293 |
| 2,026,965 | 1/1936 | Currah et al. | 362/293 |
| 2,768,284 | 10/1956 | Woolley | 362/16 |
| 2,831,104 | 4/1958 | Brandt | 362/16 |
| 4,719,545 | 1/1988 | Cano | 362/263 |
| 4,807,100 | 2/1989 | Hudimac, Jr. | 362/290 |

FOREIGN PATENT DOCUMENTS 449776  9/1927  Germany ........................... 362/255

Primary Examiner—Ira S. Lazarus
Assistant Examiner—Y. Quach

[57] ABSTRACT

A photographic lighting system provides both direct and modified light to a target from a single light source. The light source itself comprises an electrical bulb having an electrical connection inner end, a light emitting outer end and a light emitting sidewall between the inner end and the outer end of the bulb. The system further includes a mounting assembly which mounts the bulb in the system and the system includes a light modifying material fitting region which receives material positioned to modify light emitted from the side wall while allowing direct light to be emitted from the outer end of the bulb.

2 Claims, 10 Drawing Sheets

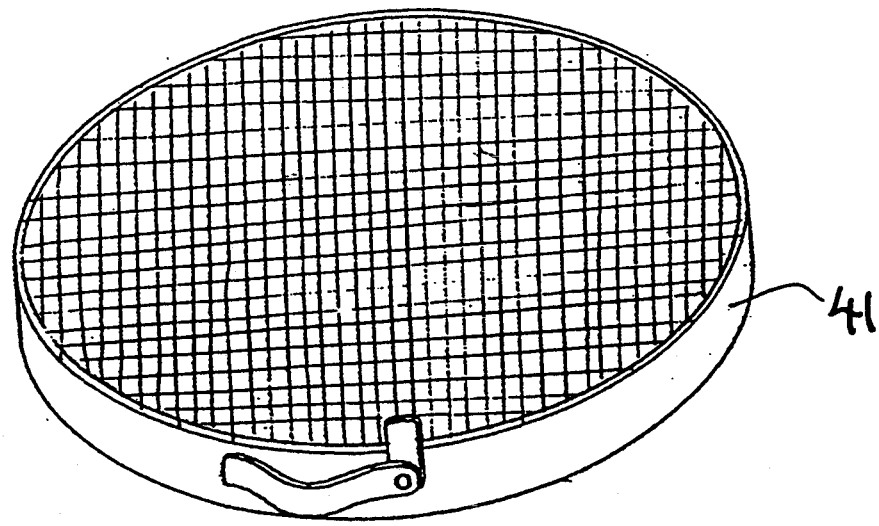
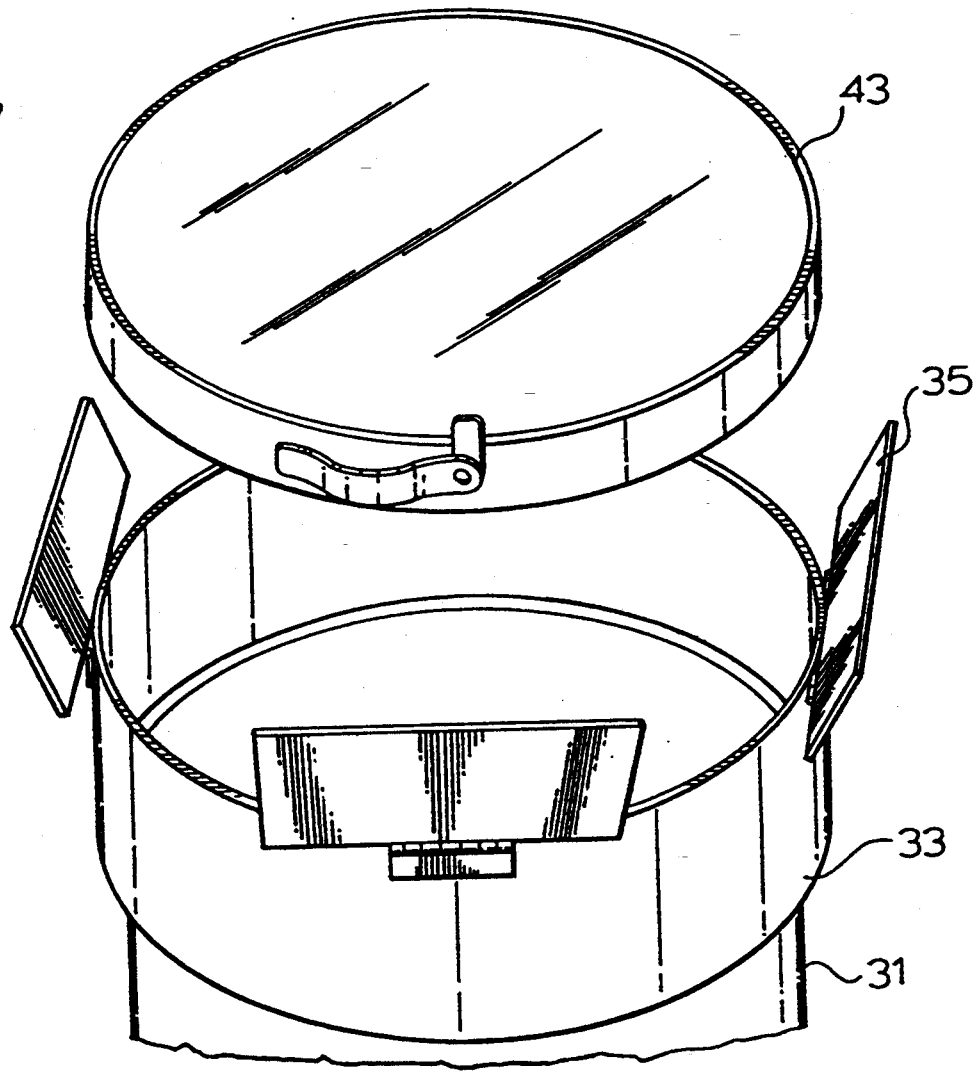
FIG. 6

PHOTOGRAPHIC LIGHTING SYSTEM

FIELD OF THE INVENTION

The present invention relates to a photographic lighting system which provides both direct and modified fill light to a target from a single light source.

BACKGROUND OF THE INVENTION

For purposes of photographic lighting having a fill light it is standard to have a first light source provide direct lighting on a target and then to have a second light source providing diffused or filtered lighting to or around the target. There is therefore the obvious problem of requiring two different light sources in this conventional set up.

As a further drawback with the conventional lighting as described above the direct and fill lighting sources must be arranged in specific positions relative to one another to provide a desired lighting effect. If the target is moved, then the two different light sources must be repositioned relative to one another in order to achieve the same lighting effect.

SUMMARY OF THE INVENTION

The present invention relates to a photographic lighting system which provides both direct and fill light to a target from a single light source. The fill light is modified by either being filtered and/or diffused. The light source itself comprises an electrical bulb and the system further including a modifying material fitting region which receives material positioned to intercept and modify some of the light emitted from the bulb while also allowing some direct light to be emitted from the bulb to the target.

The photographic lighting system of the present invention through the use of its single lighting source to provide both direct and fill light is able to overcome the drawbacks associated with the prior art multiple lighting source arrangements.

BRIEF DESCRIPTION OF THE DRAWINGS

The above as well as other advantages and features of the present invention will be described in greater detail according to the preferred embodiments of the present invention in which:

FIGS. 5 through 8 are perspective views of different attachments to the light mount shown in FIG. 2 of the drawings.

DETAILED DESCRIPTION ACCORDING TO THE PREFERRED EMBODIMENTS

Figure 1:
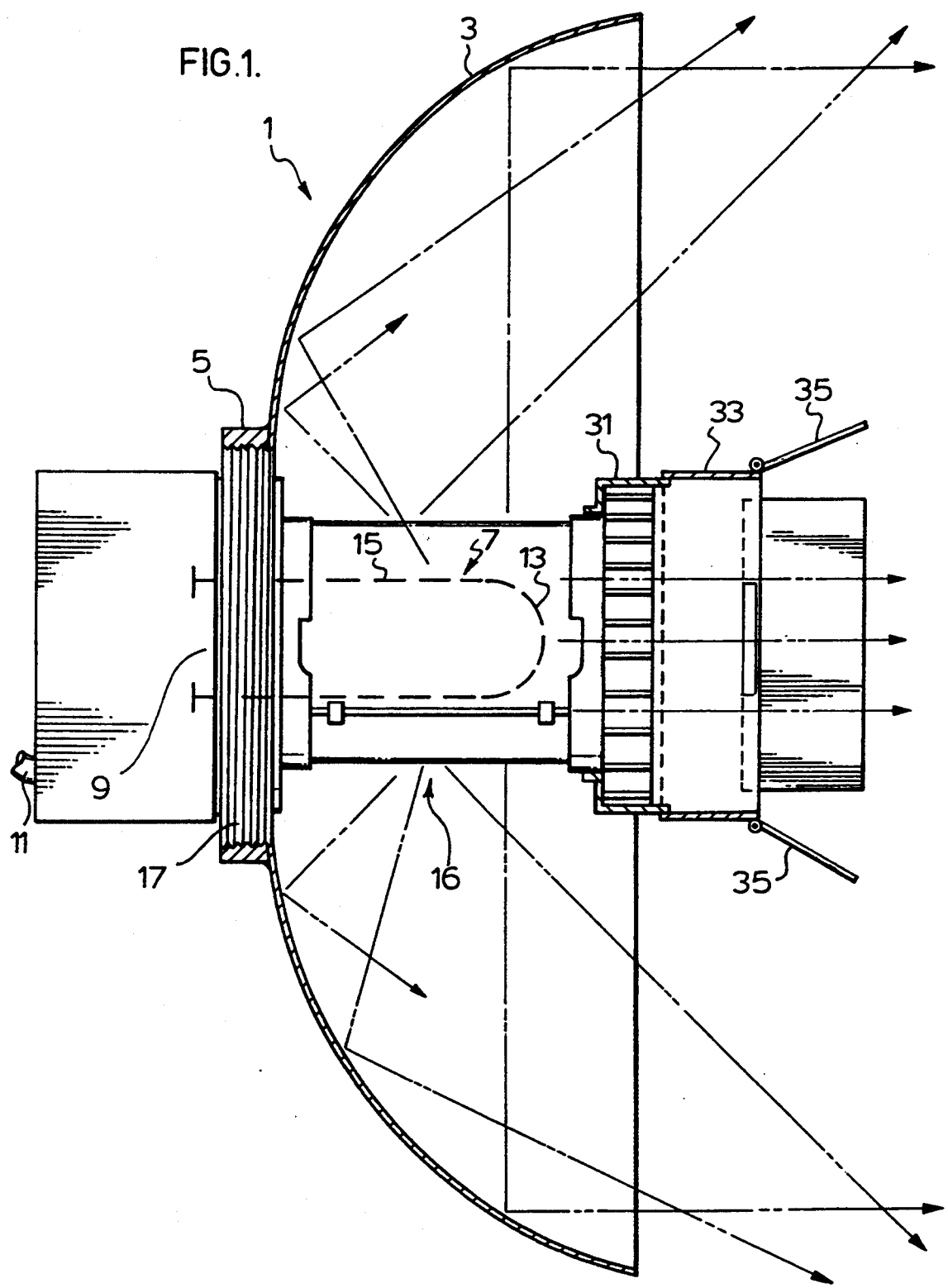
FIG. 1 is a sectional view through a lighting system according to a preferred embodiment of the present invention.

FIG. 1 shows a lighting system generally indicated at 1. This lighting system operates using a single light source for both direct or key light and fill light at a target to be photographed. The fill light is modified by either diffusing and/or filtering the fill light. The light source itself comprises an elongated bulb generally indicated at 7 having an electrically connected inner end 9 which is wired as indicated at 11 to a power source for the bulb. The bulb may be of the repetitive flashing type or it may be continuous to maintain the light at the target for a length of time as desired.

Bulb 7 includes an outer end 13 opposite its electrically connected end and further includes an elongated side wall between the inner and outer ends of the bulb.

The bulb fits within a mounting assembly generally indicated at 16. This mounting assembly includes a cage-like member generally indicated at 19 and best seen in FIG. 3 of the drawings. The cage member is in turn fitted with a threaded base 17 which fits to a pan reflector 3 having a threaded base 5 which mates with the threaded base 17 of the mounting assembly.

Figure 2:
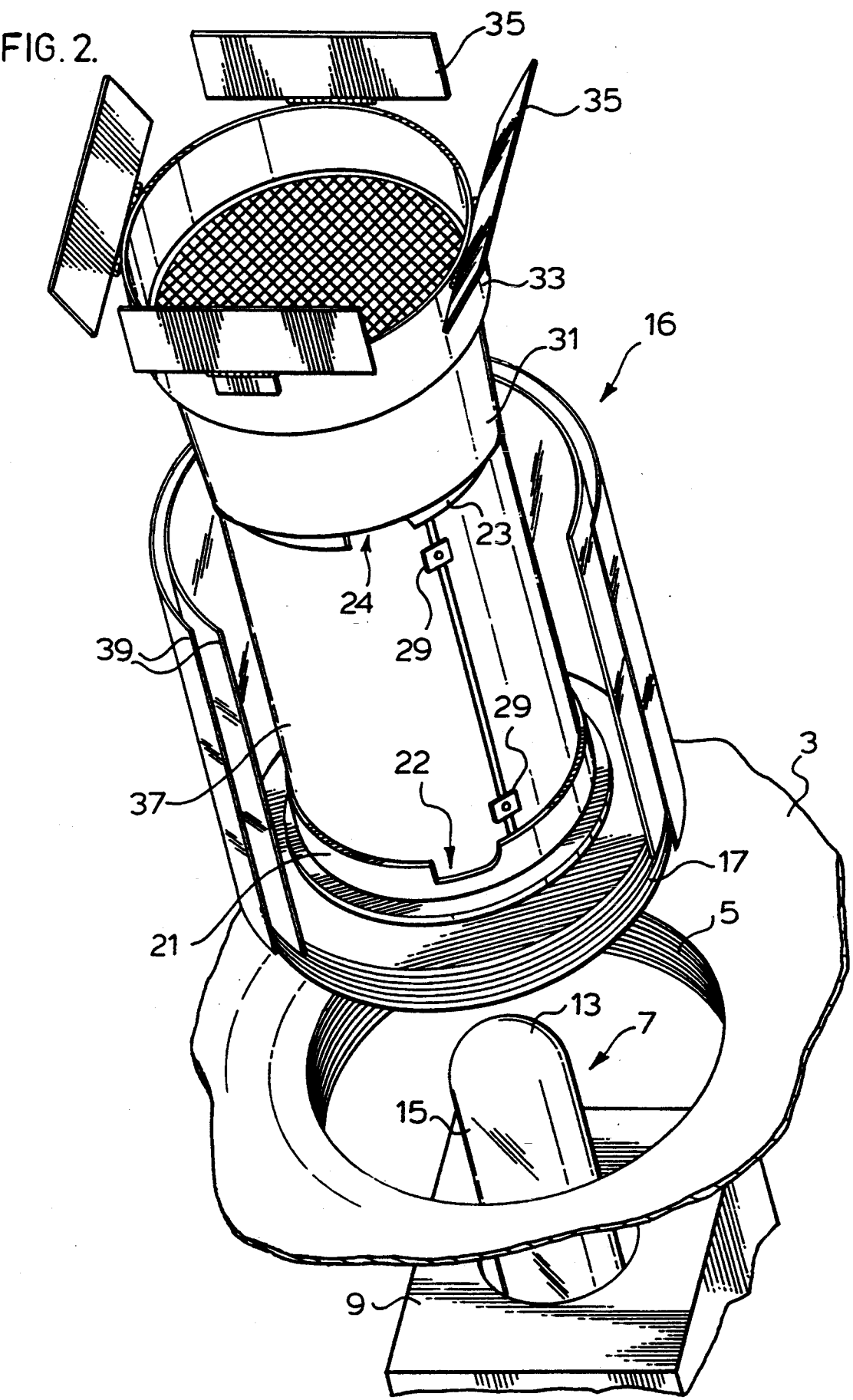
FIG. 2 is an exploded perspective view showing the light mount removed from the lighting system of FIG. 2.

As best seen in FIG. 2 of the drawings, bulb 7 is fitted through the rear opening of the pan reflector internally of mounting assembly 16 which then threads into the base of the pan reflector to secure the overall system as shown in FIG. 1 of the drawings.

As also seen in FIG. 1 of the drawings, mounting assembly 16 includes a collar 31 at its outer end opposite to the threaded base of the mounting assembly. This collar is particularly designed to receive a number of different photographic components to be described later in detail.

Figure 3:
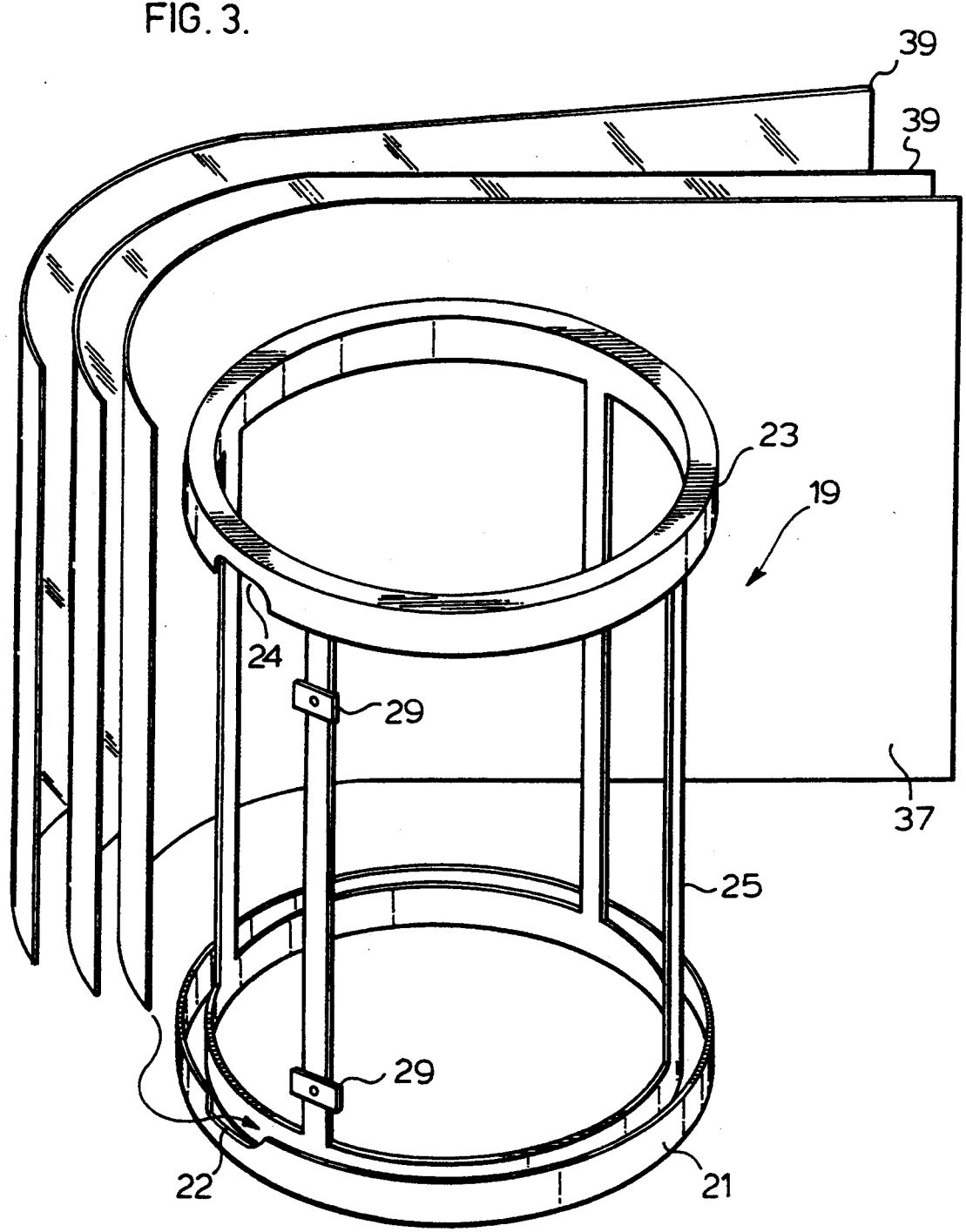
FIG. 3 is a further exploded perspective view of the light mount of FIG. 2.

The cage member 19 from the mounting assembly, as best shown in FIG. 3 of the drawings, comprises a pair of circular channel members 21 and 23 at opposite ends of the cage. Channel member 21 includes a side wall recess 22 while channel member 23 includes a side wall recess 24 which is aligned with recess 22 axially of the cage.

The two channel members are secured by means of a series of elongated bars 25 spaced circumferentially from one another around the cage. One of the bars is provided a pair of clips 29. These clips are located proximate the channel recesses 22 and 24 of the cage.

The cage as shown is completely open at both ends. This allows the insertion of the elongated bulb into the cage and, at the same time, allows light from the bulb, principally through its outer end 13, to be emitted directly through the outer end of the cage.

A sheet of diffusion material 37 is secured around the cage as shown in FIG. 3 of the drawings. This diffusion material wraps around bars 25 and fits into the channel members 21 and 23 through their recesses 22 and 24. Opposite ends of the plastic diffusion sheet then lock beneath clips 29 to hold it in position on the cage. If required, additional filtering material such as gel filters 39 can be wrapped around and secured in the cage also held in position by the circular channel members.

As earlier described, light from the outer end of bulb 7 is emitted through the outer end of the cage. This provides the direct or key lighting. However, the light emitted from the side of the bulb must first pass through diffusion material 37 as well as any filters 39 wrapped around the diffusion material where the diffused and filtered light impinges on the interior surface of pan reflector 3 and is then reflected by the pan at, or, more accurately, outwardly around the target to provide fill lighting.

The description above refers to the use of both diffusion and filter material for modifying the fill light. Each type of modifying material can be used independently of the other. The purpose of the diffusion material is to provide a soft light complimentary to the key light giving detail in the shadow areas outside the beam of the key light.

The gel filters are neutral density filters which as noted above, can be used either with or without the diffusion material. The purpose of the neutral density filters is to attenuate the light in precise increments and allow the photographer to easily and accurately establish lighting ratios as desired between the key and fill light.

Figure 5:
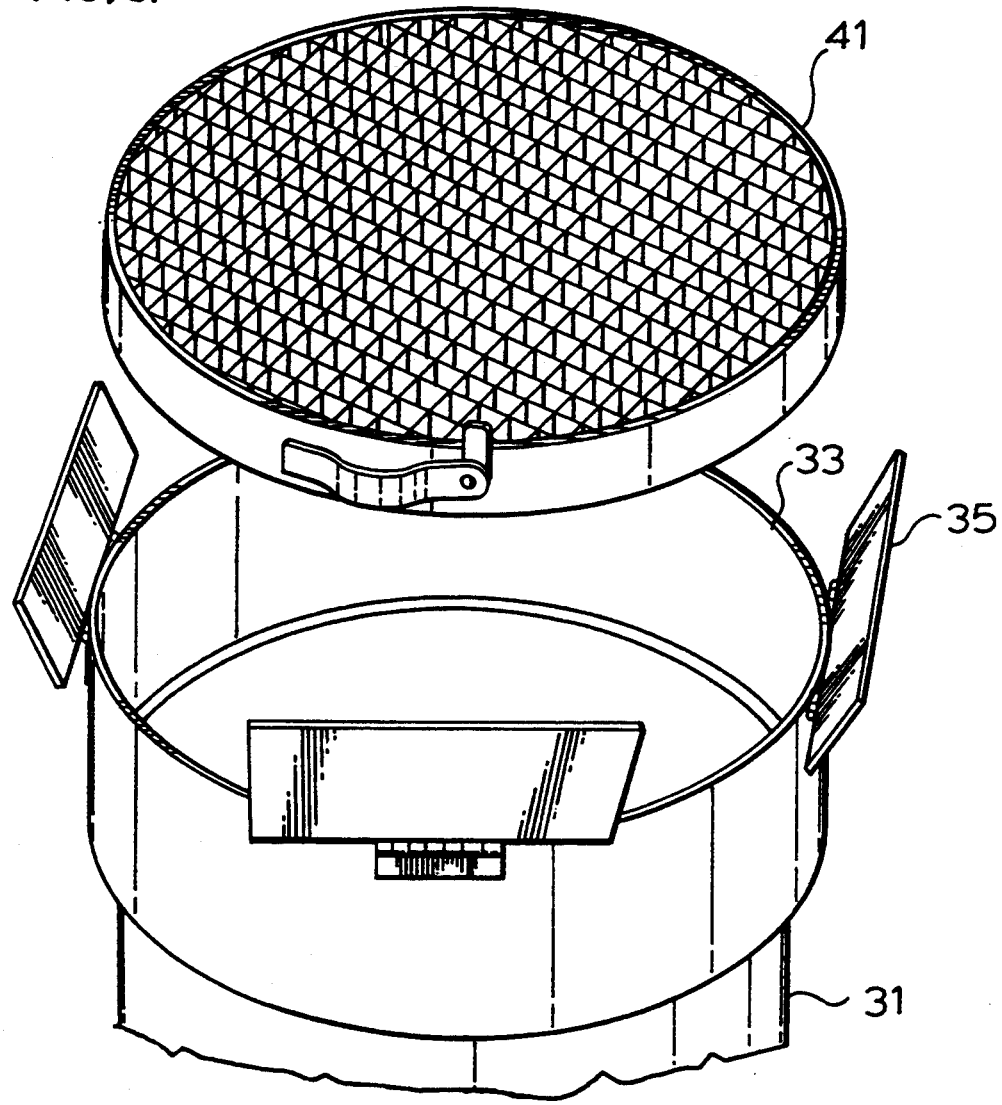

In most cases, it is desirable to filter or focus the direct light. Accordingly, the light mounting assembly is provided at its outer end with means for receiving different types of filtering or focusing elements. In the FIG. 1 set up, assembly 16 includes the forward collar 31 which holds a filter or grid element 41 as best seen in FIG. 5 of the drawings. The pattern of the grid in filter 41 dictates the degree of filtering provided. This filter is sized to frictionally secure directly within the outer collar 31 of the mounting assembly 16 as best seen in FIG. 1 of the drawings.

Also fitted to the outer end of the mounting assembly is a hood 33 which in the preferred embodiment of FIG. 1 threads to the outside of collar 31. This hood includes adjustable doors 35 which can be opened and closed relative to the hood for further focusing of the direct light emitted from the bulb.

FIG. 6 of the drawings shows a further set up in which a plexidisc 43 is fitted into collar 31 immediately beneath filter 41. This plexidisc while allowing most of the direct lighting to pass through provides some light reflection of the direct light to soften the key light while maintaining the diffused and/or filtered character of the fill light.

Figure 7:
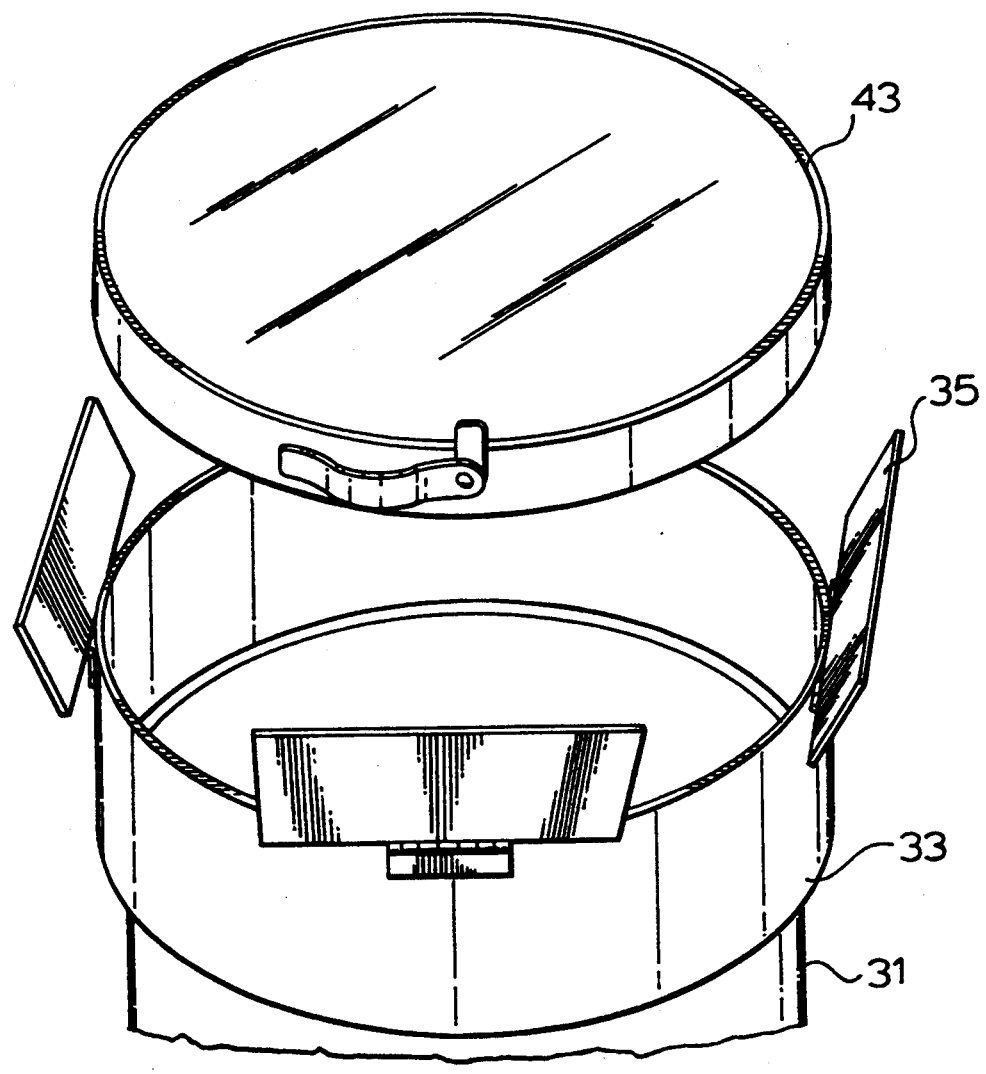

FIG. 7 shows an arrangement in which plexidisc 43 is used without filter 41.

Figure 8:
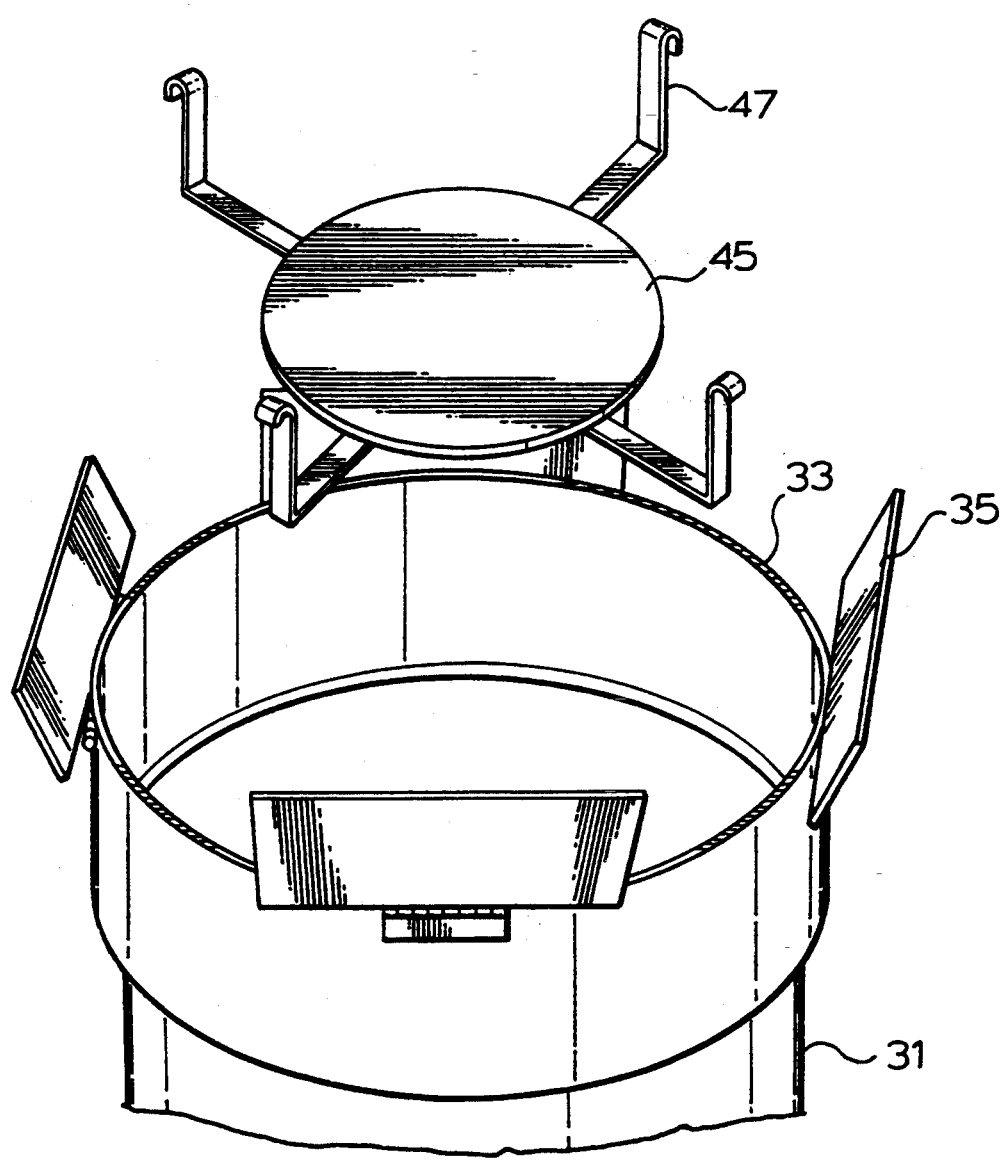

FIG. 8 of the drawings shows yet a further modification in which a blocking element 45 is inserted in collar 31 to block the direct light such that all of the light from the system comes from the pan reflector. Blocker 45 includes a plurality of hooked arms 47 which hook onto hood 33 for securing the blocker in position. This changes the system from a double to a single lighting system providing only fill light in which a separate source would then be used for key lighting.

Figure 4:
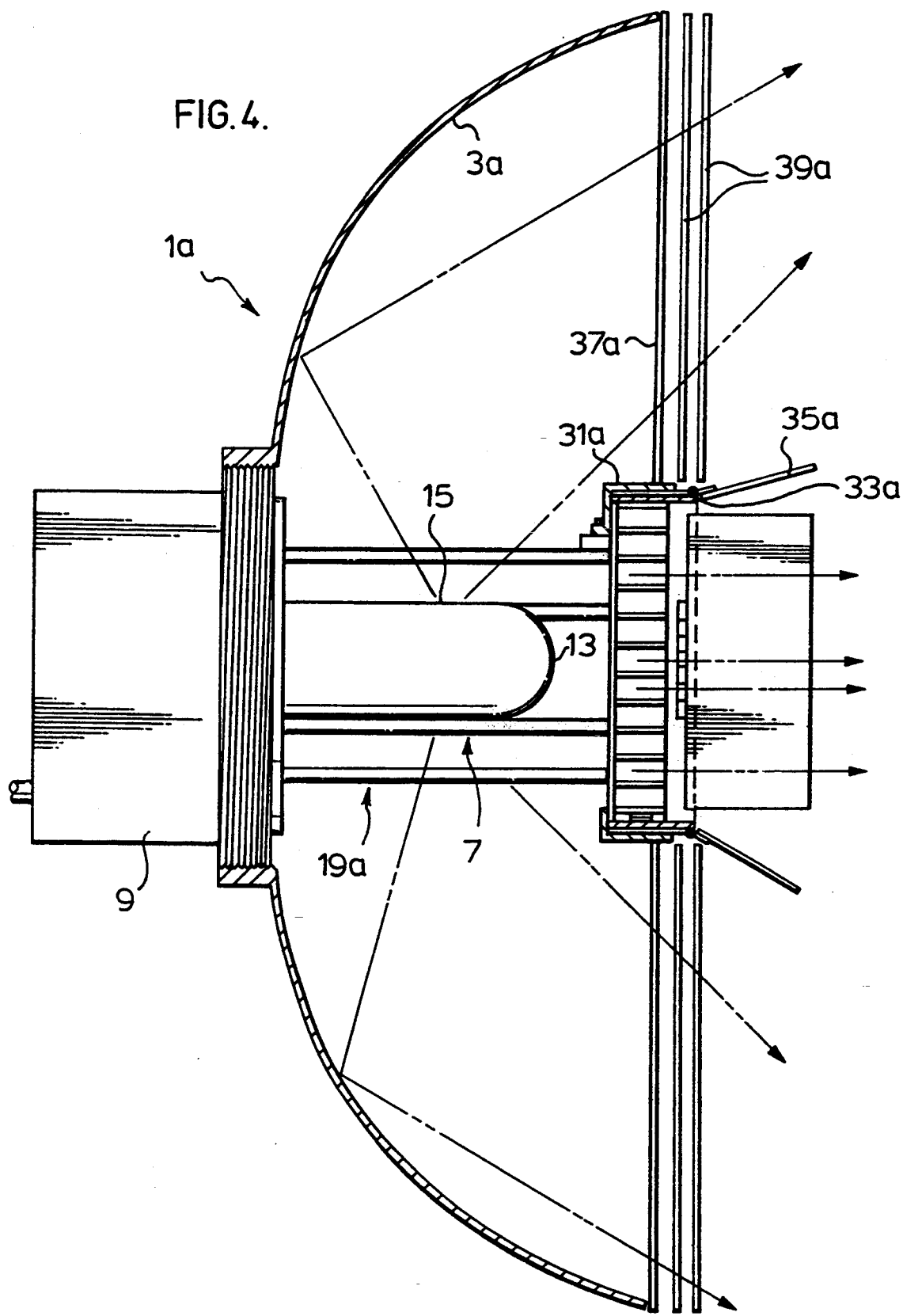
FIG. 4 is a sectional view through a lighting system according to a further preferred embodiment of the present invention.

FIG. 4 shows a lighting system 1a which is varied from system 1 earlier described. The varied system 1a uses the identical light bulb 7 having an inner electrical connection end 9, an outer bulb end 13 and a bulb sidewall 15. This light source is held by a mounting assembly 19a having a threaded base which secures into a corresponding threaded base of a pan reflector 3a.

The difference between system 1 and 1a is that in the latter system, rather than having diffusion and/or filter material wrapped around the cage of the light mounting assembly, diffusion material 37a fits across the mouth or opening of the pan reflector 3a. This diffusion material 37a has a central opening which receives the outer collar 31a of the light mounting assembly as shown in FIG. 4. If required, or in lieu of the diffusion material flat gel filters 39a can be fitted over the mouth of the pan reflector centrally cut out so as to not affect the key light.

In the FIG. 4 set up, the light emitted from the side wall of the bulb is allowed to impinge directly on the interior surface of the pan reflector without having to first pass through any diffusion or filtering materials. However, after being reflected by the pan, the light must then pass through the diffusion material and any additional filtering material before reaching the target. On the other hand, the light emitted from the end of the bulb once again passes directly out through the supporting cage directed at the target.

Collar 31a of light mounting assembly 19a can again be fitted with any combination of filters, reflectors and/or blockers as earlier described.

Figure 9:
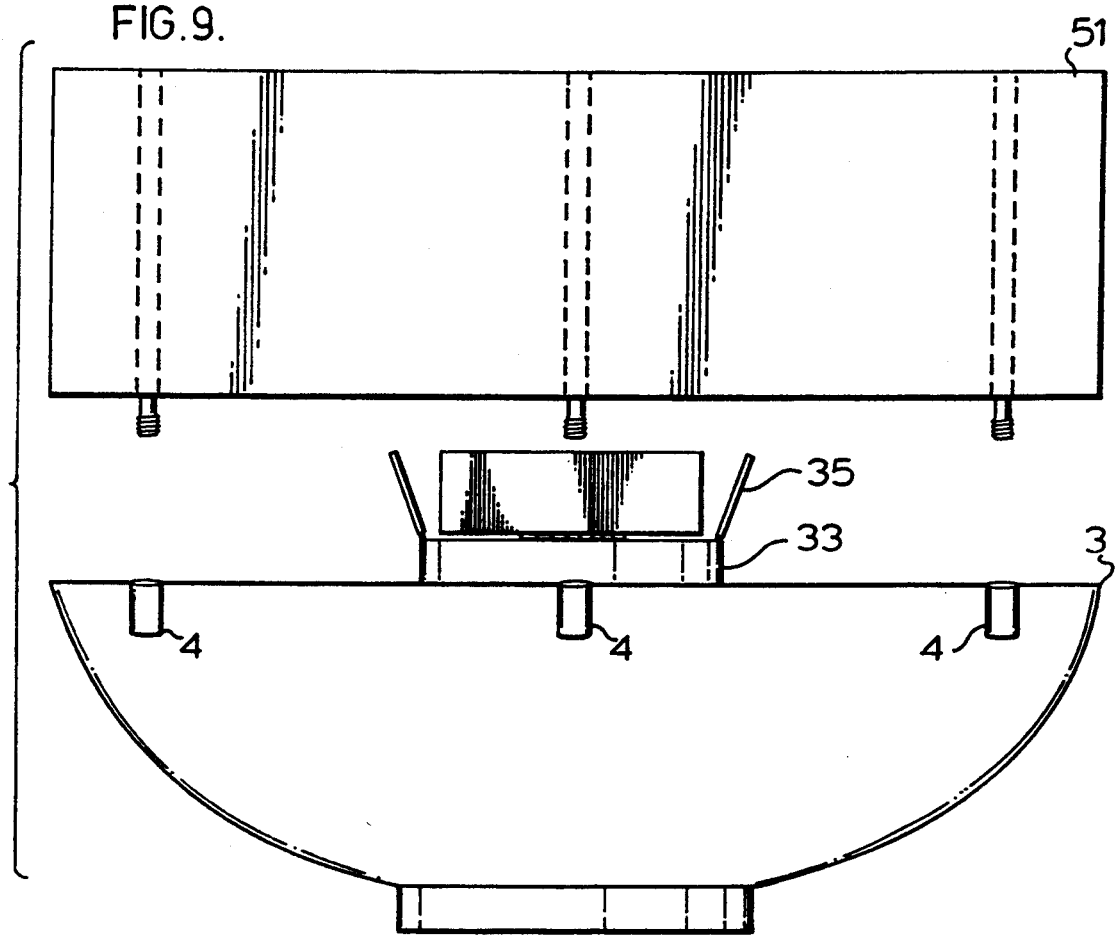
FIG. 9 is a side view of the pan reflector of FIG. 1 and a collapsible, portable focusing hood to be fitted with the pan reflector.
Figure 10:
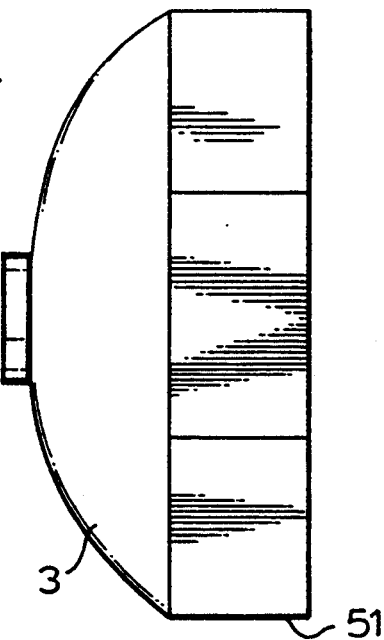
FIG. 10 is a side view of the pan reflector and hood of FIG. 9 secured to one another.

FIG. 9 shows a further feature of the present invention in which pan reflector 3 receives a hood 51. The pan reflector itself includes threaded receptacles 4 and the hood has a series of elongated threaded bolts 53 removably securable in receptacles 4. As will be apparent, the pan can be used either with or without the hood. When the hood is used, it provides a focusing of the fill light from the reflector as shown in FIG. 10. When the hood is not used, the fill light will spread to a much greater extent from the pan.

Hood 51 in itself has a very unique construction. It is made from a fabric material and therefore in addition to being portable, i.e. removable from the pan reflector, it is also completely collapsible so that it can be very easily stored when not in use.

Figure 11:
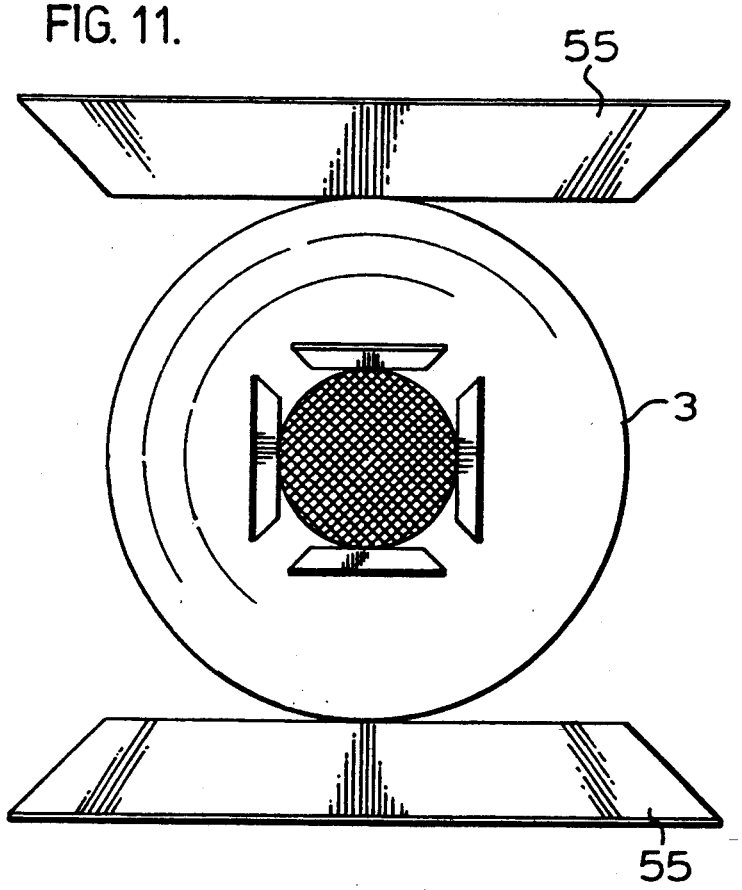
FIG. 11 is a front view of the light system of FIG. 1 additionally including outer focusing doors fitted to the pan reflector.
Figure 12:
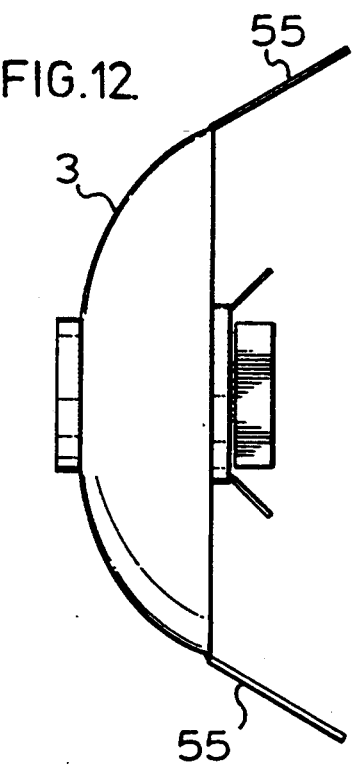
FIGS. 12 and 13 are side views of the system of FIG. 11 with the outer doors in different fill light focusing positions.
Figure 13:
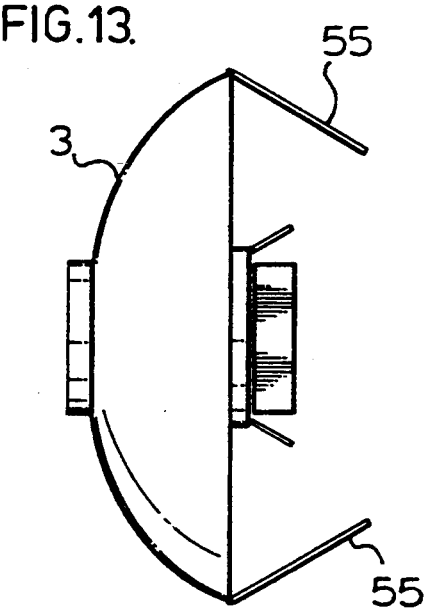

FIG. 11 shows pan reflector 3 fitted with movable doors 55, which again provide focusing of the fill light. The doors swing open and closed relative to the pan reflector as shown in FIGS. 12 and 13. When they are in the more open FIG. 12 position, some of the fill light spreads widely from the pan. In the FIG. 13, more closed position, the spread of the fill light is much narrower.

Doors 55 have opposite side treatments where one side of each door has a dark, and preferably black colouring whereas, the other side of each door is of a much lighter and preferably white or silver colour. Furthermore, the doors are removably and reversibly fitted to the reflector. When the doors are positioned with the lighter side facing in toward the bulb, as shown in FIG. 12, there is an extra wide wrap around of the fill light. With the doors positioned with the darker side facing in toward the bulb as shown in FIG. 13, the doors are used to feather the fill light, i.e. to restrict the angle of the fill light.

Although various preferred embodiments of the invention have been described in detail, it will be appreciated by those skilled in the art that variations may be made without department from the spirit of the invention or the scope of the appended claims.

The embodiments of the invention in which an exclusive property or privilege is claimed are defined as follows:

1. A lighting system providing both key and fill light towards a target from a single light source, said single light source comprising a light bulb having an outer end surface which is a first light emitting region and a side surface which is a second light emitting region, said bulb being mounted, within a light support cage, in an open mouth reflector with a curved sidewall, said cage being releasably secured centrally of said reflector and having an open end and a substantially open side region, said outer end surface of said bulb facing outwardly of said reflector through said open end of said cage and said side surface of said bulb facing said sidewall of said reflector through said open side region of said cage, said cage including channel members which face one another at opposite ends of said cage and said lighting system including light modifying material wrapped around said cage trapped in said channel members to intercept and modify light emitted from said side surface of said bulb without intercepting light emitted from said outer end surface of said bulb.

2. A lighting system as claimed in claim 1 further including a hood at said open end of said cage support and said hood includes key light focusing adjustable doors.

* * * * *